United States Patent
Aprile

(10) Patent No.: US 9,547,081 B2
(45) Date of Patent: Jan. 17, 2017

(54) SYNTHETIC-APERTURE-RADAR APPARATUS AND METHOD FOR PRODUCTION OF SYNTHETIC-APERTURE-RADAR IMAGES OF MOVING OBJECTS

(71) Applicant: SELEX ES S.p.A., Rome (IT)

(72) Inventor: Angelo Aprile, Glussago (IT)

(73) Assignee: SELEX ES S.P.A. (IT)

( * ) Notice: Subject to any disclaimer, the term of this patent is extended or adjusted under 35 U.S.C. 154(b) by 137 days.

(21) Appl. No.: 14/369,685

(22) PCT Filed: Dec. 28, 2012

(86) PCT No.: PCT/IB2012/057800
§ 371 (c)(1),
(2) Date: Jun. 28, 2014

(87) PCT Pub. No.: WO2013/098793
PCT Pub. Date: Jul. 4, 2013

(65) Prior Publication Data
US 2014/0361921 A1    Dec. 11, 2014

(30) Foreign Application Priority Data
Dec. 29, 2011    (IT) .............................. MI2011A2428

(51) Int. Cl.
*G01S 13/90*    (2006.01)

(52) U.S. Cl.
CPC .................................. *G01S 13/9029* (2013.01)

(58) Field of Classification Search
CPC .. G01S 13/9029; G01S 13/9035; G01S 13/90; G01S 13/42; G01S 7/414; G01S 2013/9064; G01S 13/89; G01S 7/415
(Continued)

(56) References Cited

U.S. PATENT DOCUMENTS 7,741,990 B2 *    6/2010    Aprile ................. G01S 13/9029
                                                                     342/159
9,291,711 B2 *    3/2016    Healy, Jr. ............ G01S 13/9035
(Continued)

FOREIGN PATENT DOCUMENTS

EP    0778471 A1 *    6/1997    .............. G01S 13/90
EP    1876470 A1 *    1/2008    ......... G01S 13/9029
EP    2574957 A1 *    4/2013    .............. G01S 13/53

OTHER PUBLICATIONS

Werness S et al: "Moving Target Imaging Algorithm for SAR Data" ICCC Transactions on Aerospace and Electronic Systems, IEEE Service Center, Piscataway, NJ, US, vol. 29, No. 1, Jan. 1, 1990, pp. 57-66, XP000104240, ISSN: 0018-9251, DOI: 10.1109/7.53413 sec. II; abstract; figure 1.

(Continued)

*Primary Examiner* — John B Sotomayor
(74) *Attorney, Agent, or Firm* — The Belles Group, P.C.

(57) ABSTRACT

A SAR apparatus including: a radar transceiver to emit electromagnetic pulses and to provide a radar signal in response to echoes of the electromagnetic pulses; and a processing unit, configured to produce SAR images of moving objects from the radar signal. The processing unit includes: a first processing module to apply translational motion compensation to a central reference point of a moving object in a subaperture of the radar signal; a second processing module, to execute phase compensation with the single central reference point as reference; and a third processing module to apply phase compensation to the radar signal as a function of an estimated phase component the auxiliary point and of a normalization parameter to a distance in range between the central reference point and the auxiliary point.

16 Claims, 4 Drawing Sheets

(58) Field of Classification Search
USPC .................................. 342/25 R, 25 A–25 F
See application file for complete search history.

(56) References Cited

U.S. PATENT DOCUMENTS

| | | | | |
|---|---|---|---|---|
| 2006/0109162 | A1* | 5/2006 | Krikorian et al. | G01S 13/90 342/25 B |
| 2007/0139250 | A1* | 6/2007 | Perry et al. | G01S 13/9029 342/25 B |
| 2008/0224923 | A1* | 9/2008 | Aprile | G01S 13/9029 342/25 D |
| 2009/0295625 | A1* | 12/2009 | Voelker | B64G 1/1021 342/25 A |
| 2010/0321234 | A1* | 12/2010 | Goldman | G01S 13/9029 342/25 A |

OTHER PUBLICATIONS

Aprile A et al: "Translational rotational motion compensation: a single algorithm for different radar imaging applications", IET Signal Processing, vol. 2, No. 3, Sep. 4, 2008, pp. 204-215, XP006031594, ISSN: 1751-9683, DOI: 10.1049/IET-SPR:20070080, sec. 1-3; figure 2.

Wenchong Xie et al: "Imaging Algorithm of Missile-Borne MMW SAR for Ground Moving Target" Radar Conference, 2007, IEEE, IEEE, PI, Apr. 1, 2007, pp. 552-557, XP031180966, ISBN: 978-1-4244-0283-0, sec. III, A, V, and VI; figure 2.

Aprile A et al: "Application of the TRMC processing chain to SAR/ISAR imaging", Radar Conference, 2009, pp. 429-432, XP031558292, ISBN: 978-1-4244-4747-3, sec. III; figure 2.

Mark A Stuff et al: "Automated two and three dimensonal, fine resolution, radar imaging of rigid targets with arbitrary unknown motion", Proc. SPIE 2230, Algorithms for Synthetic Aperture Radar Imagery, 180, Jun. 9, 1994, XP055039635, DOI: doi 10.1117/12. 177171 Retrieved from the Internet URL: proceedings.spiedigitallibrary.org/data/Conferences/SPIEP/47226/180_1.pdf, [Retrieved on Oct. 1, 2012] figure 1.

Ahmed R. Fasih et al: "Analysis of target rotation and translation in SAR imagery", Proceedings of SPIE, Jan. 1, 2009, pp. 73370F-73370F-12, XP055039636, DOI: 10.1117/12.819188, the whole document.

Corresponding International Search Report and Written Opinion PCT/IB2012/057800 dated May 15, 2013.

* cited by examiner

SYNTHETIC-APERTURE-RADAR APPARATUS AND METHOD FOR PRODUCTION OF SYNTHETIC-APERTURE-RADAR IMAGES OF MOVING OBJECTS

CROSS-REFERENCE TO RELATED PATENT APPLICATIONS

The present application is a U.S. national stage application under 35 U.S.C. §371 of PCT Application No. PCT/IB2012/057800, filed Dec. 28, 2012, which claims priority to Italian Application No. MI2011A002428, filed Dec. 29, 2011, the entireties of which are incorporated herein by reference.

TECHNICAL FIELD

The present invention relates to a synthetic-aperture-radar apparatus and a method for the production of synthetic-aperture-radar images concerning moving objects, with particular reference to objects moving on the ground.

BACKGROUND ART

As is known, the processing of images acquired via SAR (Synthetic Aperture Radar) systems enables detecting the presence of moving objects in the observed scene. In the case of aerial or naval targets, the SAR images can also be effectively used for classifying the identified targets.

The movement of mobile objects on the ground (also known as ground movers), such as motor vehicles for example, has characteristics such that the currently available SAR systems do not provide satisfactory results.

One of the main causes of the scarce effectiveness of known SAR systems in acquiring images of objects moving on the ground derives from the fact that land transport vehicles are subject to vibration and rapid changes in direction. Critical vibrations may depend, for example, on uneven ground, while changes in direction may be due to simple corrections in trajectory by the driver while the vehicle is travelling along a stretch of road, even if substantially straight. Irregularities of this type generally entail vehicle displacements in the order of a few centimeters, i.e. quantities comparable with the central wavelength of the electromagnetic pulses emitted by the most common SAR systems. As SAR images are basically constructed from information on the phase of the reflected pulses received, it is evident that changes comparable with the wavelength of the signal, and totally unpredictable, generate errors that cannot be reduced within acceptable limits with conventional focusing methods, which assume either rectilinear motion or knowing the motion of the target beforehand. In fact, these methods use tracking algorithms to obtain the overall speed of the detected object to compensate for the effects of motion in the SAR images. However, at present, tracking algorithms that are so sophisticated as to follow the motion of objects on the ground with sufficient precision to obtain satisfactorily focused images are unavailable (the highest accuracy levels are in the order of meters per second, when instead a precision of millimeters per second would be needed).

Another aspect that makes it difficult to produce SAR images of objects moving on the ground is the choice of the moment when to start processing. In fact, it is not enough to detect the presence of a moving object, but it is also necessary that the object has an adequate angular velocity with respect to the SAR observer. A known solution, albeit unsatisfactory, makes use of roadmaps related to the observed scene, in practice assuming that the moving object is a means of transport travelling along a road. Once the presence of an object moving on the ground has been detected, a tracking algorithm calculates the motion. On the basis of the position in the SAR images and the trajectory characteristics, the moving object is placed on a road on the map and processing commences when it is possible to determine that the moving object is approaching a curved stretch that offers the necessary and assured angular rotation usable for generating the SAR image. The effectiveness is therefore modest and, in addition, it is necessary to have maps and carry out operations to correlate the position of the moving object in the SAR images to points on the maps.

DISCLOSURE OF INVENTION

The object of the present invention is to provide a synthetic-aperture-radar apparatus and a method for the production of synthetic-aperture-radar images that enables the described limitations to be overcome and, in particular, enables focusing on objects moving on the ground.

According to the present invention, a synthetic-aperture-radar apparatus and a method for the production of synthetic-aperture-radar images are provided as defined in claim 1 and claim 9, respectively.

BRIEF DESCRIPTION OF THE DRAWINGS

For a better understanding of the invention, an embodiment will now be described, purely by way of non-limitative example and with reference to the attached drawings, where.

BEST MODE FOR CARRYING OUT THE INVENTION

Figure 1:
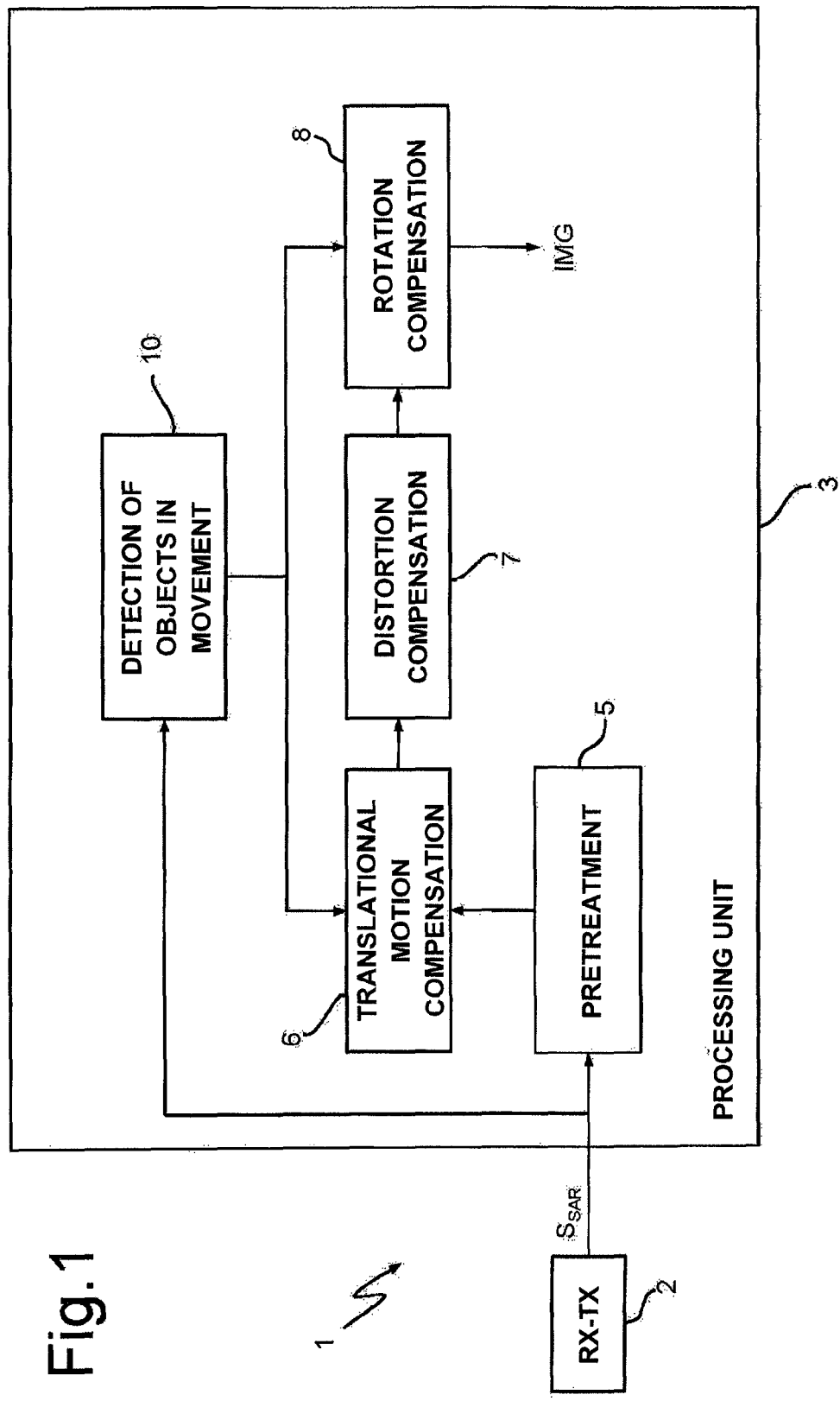
FIG. 1 is a simplified block diagram of a synthetic-aperture-radar apparatus in accordance with an embodiment of the present invention.

With reference to FIG. 1, a synthetic-aperture-radar apparatus or SAR apparatus 1 comprises a radar transceiver 2, equipped with an antenna (not shown) connected to a processing unit 3. The radar transceiver 2 emits electromagnetic pulses at a pulse repetition frequency PRF in the direction of a surveillance area and provides a radar signal $S_{SAR}$ determined by return echoes coming from objects within this area.

The processing unit 3 is configured to produce images of moving objects present in the surveillance area from the radar signal $S_{SAR}$.

In detail, the processing unit 3 comprises a pretreatment module 5, a translational motion compensation module 6, a distortion compensation module 7, a rotation compensation module 8 and a moving object detection module 10; the latter, for example, being of the type described in patent EP-A-1 876 470 in the name of the same applicant, efficiently detects the presence of moving objects in the surveillance area framed by the radar transceiver 2 and is also configured to track their movement. The output of the moving object detection module 10, containing information regarding both presence and localization/tracking is provided to the translational motion compensation module 6 and the rotation compensation module 8.

The pretreatment module 5 performs preliminary processing steps on the radar signal $S_{SAR}$, in themselves known. In particular, the pretreatment module 5 applies automatic control processes to the radar signal $S_{SAR}$ for gain, pulse compression and compensation of the residual video phase.

The translational motion compensation module 6 operates on the basis of information received from the moving object detection module 10. The translational motion compensation module 6 is activated in response to the detection of an object moving on the ground, a so-called ground mover GM, and is configured to apply a compensation process to the pretreated radar signal $S_{SAR}$ on the translational component of a central reference point CRP belonging to the ground mover GM (see FIG. 2). In particular, the translational motion compensation module 6 uses subapertures of brief duration (for example, 64 ms) and selects a dominant reflector on the ground mover GM as the central reference point CRP, namely a point of maximum reflectivity of the ground mover GM in a Doppler-range coordinate representation derived from the radar signal $S_{SAR}$. The compensation process for the translational motion component, or TMC process, is in itself known. An example of a compensation process for the translational motion component has been described in "A NEW APPROACH FOR ESTIMATION AND COMPENSATION OF TARGET TRANSLATIONAL MOTION IN ISAR IMAGING", APRILE ET AL., IEEE European Radar Conference—Rome, May 2008.

Figure 2:
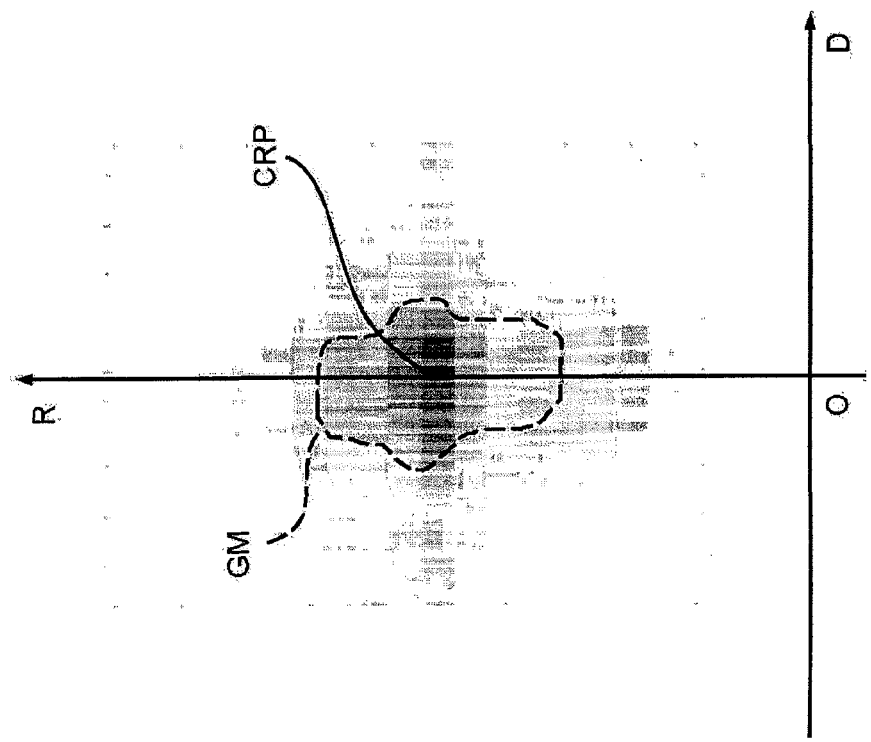
FIG. 2 is a simplified two-dimensional representation a transformation in the Range-Doppler plane of a radar signal processed by the apparatus in FIG. 1.

As a consequence of the procedure of compensating the translational motion component, the image in Doppler-range coordinates is transformed so that the central reference point CRP is transferred to the zero Doppler coordinate, as shown in FIG. 2.

The choice of the dominant reflector as the central reference point CRP is advantageous because, on the one hand, the condition of having a single dominant reflector for each ground mover GM is generally found and, on the other, given the small size of the target and the variability of the associated signal, there is a high probability that the reflector chosen as the central reference point CRP is always the same one.

The distortion compensation module 7 isolates, by low-pass filtering, the spectral components associated with the ground mover GM and performs compensation on the distortions by means of a PGA (Phase Gradient Autofocus) process. The PGA process, in itself known, enables estimating and compensating all of the non-linear phase components and is usually applied to the entire image to remove the effect of vibration on the transported SAR platform. Instead, the distortion compensation module 7 applies the PGA process to estimate the distorting phase on the range coordinate of just the central reference point CRP and the so-obtained estimate is used to compensate the entire radar signal $S_{SAR}$. At the end of the process, the central reference point CRP is perfectly focused. It still remains to compensate the effect of rotatory motion around the central reference point CRP for the remaining image points of the ground mover GM. This rotatory motion is the result of a combination of a component due to motion of the platform transporting the apparatus 1 with respect to the ground position of the ground mover GM and a component associated with the ground movement of the ground mover GM itself. However, this last component is unpredictable, as it suffers from the frequent, small corrections of trajectory that are normally made whilst driving. The relative rotation between the apparatus 1 and the ground mover GM is particularly evident when the ground mover GM travels along winding stretches.

In general, the rotatory component of the relative motion between a radar apparatus and any kind of target is necessary so that an image of the target can be obtained. However, the image of the target is not correctly focused if the effect of the rotational movement is not compensated for in the received radar signal.

To this end, the rotation compensation module 8, in addition to completing the focusing, uses information on the rotation of the ground mover GM around the central reference point CRP to identify suitable conditions for starting the production of SAR images of the ground mover GM.

Figure 3:
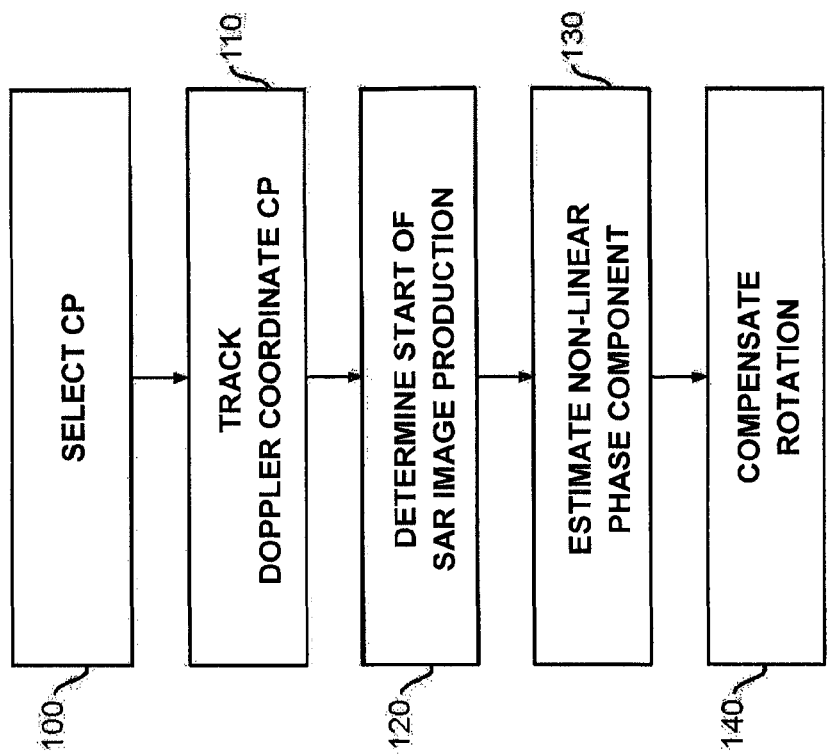
FIG. 3 is a flowchart regarding the steps of a method for the production of synthetic-aperture-radar images in accordance with an embodiment of the present invention.
Figure 4:
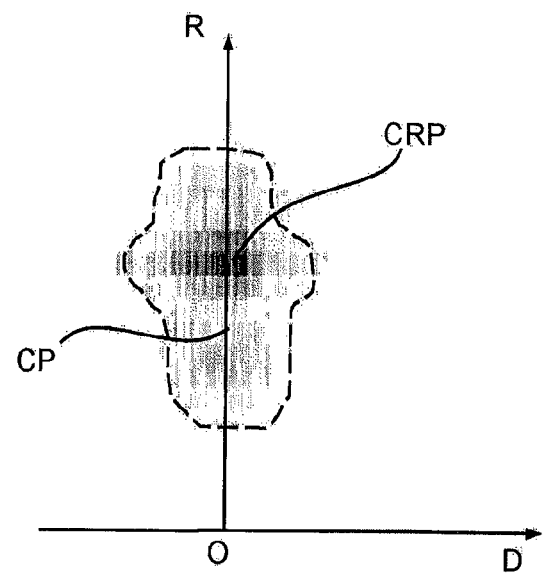
FIG. 4 is a graph showing quantities related to SAR images produced with the method according to the invention.
Figure 5:
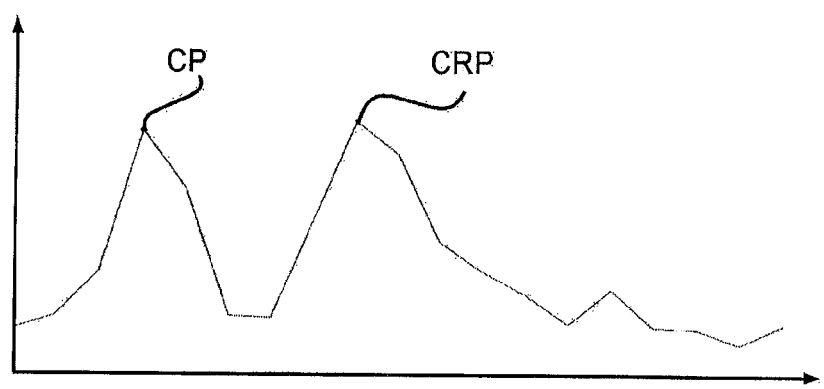
FIG. 5 is a simplified two-dimensional representation of the radar signal processed in a successive processing step.

With reference to FIGS. 3-5, the rotation compensation module 8 initially selects (block 100) one or more auxiliary points CP of the ground mover GM (FIG. 4). In one embodiment, in particular, the rotation compensation module 8 selects the auxiliary points CP whose contrast in the time domain exceeds a certain threshold, the contrast C being defined as:

$$C(rb) = \left(\frac{avg[|s(rb, i)|]}{stdv[|s(rb, i)|]}\right)^2 \qquad (1)$$

where "avg" and "stdv" respectively indicate the average and standard deviation operators, "s" indicates the complex representation in the time domain of the radar signal $S_{SAR}$ received and available downstream of the distortion compensation module 7, and "rb" and "i" are respective discrete indices of the range coordinate and slow-time coordinate in each subaperture.

The search for auxiliary points CP is extended to all the range coordinate indices rb other than that of the central reference point CRP. A graph of a possible example of contrast for the ground mover GM is illustrated in FIG. 5, where the central reference point CRP and a single auxiliary point CP are shown. The thus-determined auxiliary points CP stand out from the other surrounding reflectors and are therefore identifiable with a high probability independently of perturbations induced on the radar signal $S_{SAR}$ by unpredictable factors such as trajectory corrections.

The rotation compensation module 8 starts to track the Doppler coordinate of the selected auxiliary points CP in successive subapertures (FIG. 3, block 110) and determines the moment when to start producing SAR images from the compensated radar signal $S_{SAR}$ (block 120). In particular, the moment when the production of images starts is determined on the basis of changes in the respective Doppler coordinates of the auxiliary points CP and their derivatives, which are representative of the angular velocity of the ground mover GM. In a different embodiment, the rotation compensation module 8 expressly calculates an estimate of the angular velocity of the ground mover GM from the Doppler coordinates of the auxiliary points CP and their derivatives.

Production of SAR images preferably starts when the speed maintains a value above a threshold. In this way, the angular velocity is sufficient to generate SAR images.

Figure 6:
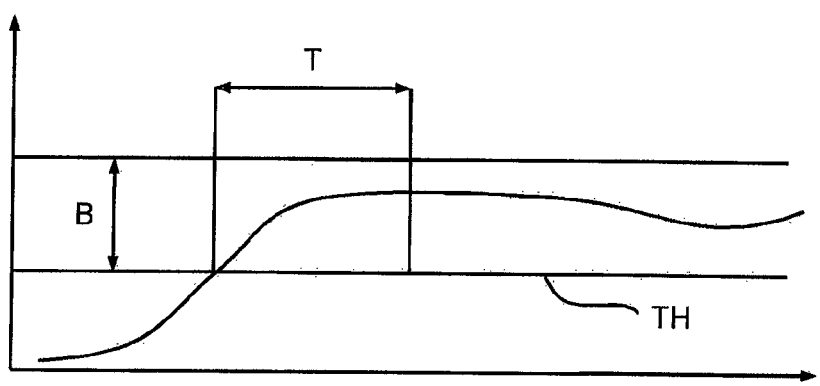
FIG. 6 is a graph showing quantities processed with the method according to the invention.

In one embodiment, in particular, the rotation compensation module 8 starts to process the radar signal $S_{SAR}$ for producing SAR images when the angular velocity calculated from the phase estimate of the auxiliary point remains for a period of time T in a band B, the bottom limit of which is greater or equal to a threshold TH, as shown by way of example in FIG. 6.

The rotation compensation module 8 applies the PGA process to the auxiliary point CP furthest away from the central reference point CRP, thus obtaining an estimate of the non-linear phase component of the portion of the radar signal $S_{SAR}$ corresponding to the auxiliary point CP (block 130). As a consequence of the previous processing, the non-linear phase component is reduced to the contribution due to rotation, not necessarily constant in the interval considered.

The distorting effect of rotation on the radar signal $S_{SAR}$ is then compensated by using the phase estimate provided by applying the5 PGA process to the auxiliary point CP (block 140).

More precisely, the rotation compensation module 8 exploits the fact that the phase change associated with each point of the ground mover GM and due to rotation is proportional to the distance from the central reference point CRP. Indicating the generic image point with range and slow-time coordinates rb and i, respectively, as s(rb, i), the image point having the same coordinates after compensation as $s_c$(rb, i) and the phase estimate provided by the PGA process to the range coordinate $rb_{CP}$ (FIG. 4) of the auxiliary point CP as $\Phi_{CP}(i)$, the rotation compensation module 8 performs the compensation in the following manner:

$$s_C(rb, i) = s(rb, i) \cdot e^{-j \cdot \varphi_{CP}(i) \left[1 - \frac{(rb - rb_{CP})}{(rb_{CRP} - rb_{CP})}\right]} \quad (2)$$

In practice, phase compensation, which is a function of the phase estimate $\Phi_{CP}(i)$ for the auxiliary point CP provided by the PGA process and is normalized to the distance in range (namely the $rb_{CRP}$-$rb_{CP}$ term) between the central reference point CRP and the auxiliary point CP, is applied to the radar signal $S_{SAR}$. In this way, a valid approximation may be made for an ideal compensation, which is only possible with precise knowledge of the angular velocity of the ground mover GM.

Figure 7:
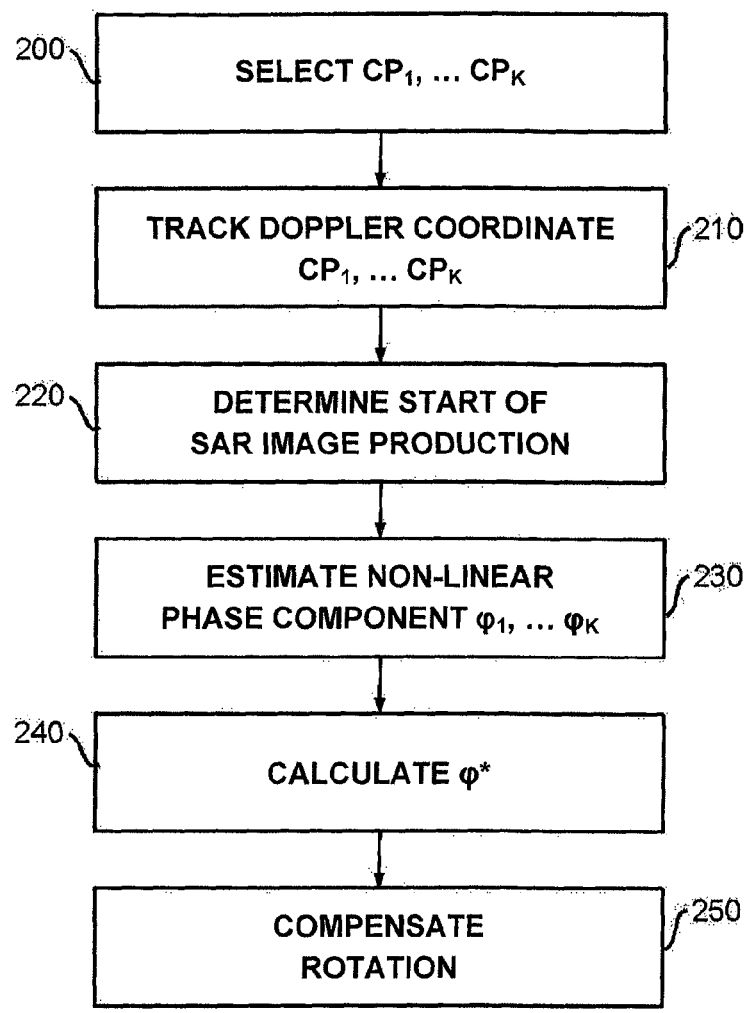
FIG. 7 is a flowchart regarding the steps of a method for the production of synthetic-aperture-radar images in accordance with a different embodiment of the present invention.

In a different embodiment of the invention (FIG. 7), the rotation compensation module 8 initially selects a plurality of auxiliary points CP1, . . . , $CP_K$ (block 200), tracks their Doppler coordinates (block 210) and determines the moment when to start the production of SAR images from the compensated radar signal $S_{SAR}$ (block 220), substantially as already described with reference to FIG. 3.

Then, the PGA process is applied to the auxiliary points $CP_1$, . . . , $CP_K$ (or possibly to a subset thereof, chosen on the basis of the distance from the central reference point CRP), obtaining respective estimates $\Phi_1(i)$, . . . , $\Phi_K(i)$, of the non-linear phase component of the portion of the radar signal $S_{SAR}$ (block 230).

The rotation compensation module 8 then calculates an average $\Phi^*(i)$ of the respective estimates $\Phi_1(i)$, . . . , $\Phi_K(i)$, normalized with respect to the distances in range of the respective auxiliary points $CP_1$, . . . , $CP_K$ from the central reference point CRP (block 240).

The compensation is finally performed by using the average $\Phi^*(i)$ in equation (2) (block 250).

The described apparatus enables producing SAR images in which the unpredictable motion components, peculiar to objects moving on the ground, are compensated for in an extremely effective manner. The SAR images can then be focused correctly and the definition of the moving objects is sufficient to allow classification.

The apparatus is also able to automatically detect suitable conditions for the production of SAR images without the need for additional information, in particular regarding the configuration of the land or the road network, or when this information cannot be used. For example, in cases of tracked or off-road vehicles, which are not strictly obliged to follow a road route.

In addition, the apparatus can be also advantageously used in the form described for generating images in order to identify aircraft and waterborne craft and not just moving objects on the ground.

Finally, it is clear that various modifications and changes can be made to the apparatus and method described and illustrated herein without leaving the scope of protection of the present invention, as defined in the appended claims.

The invention claimed is:

1. A synthetic-aperture-radar apparatus, comprising:
a radar transceiver, configured to emit electromagnetic pulses towards a surveillance area and to provide a radar signal in response to reception of echoes of the electromagnetic pulses; and
a processing unit, configured to produce synthetic-aperture-radar images of moving objects present in the surveillance area starting from the radar signal;
wherein the processing unit comprises:
a first processing module, configured to apply a process of translational motion compensation to a central reference point of a moving object in a subaperture of the radar signal;
a second processing module, configured to execute a first phase-compensation process with the single central reference point as reference; and
a third processing module, configured to estimate a phase component of at least one auxiliary point of the moving object distinct from the central reference point and to apply phase compensation to the radar signal as a function of the phase component of the auxiliary point and of a normalization parameter to a distance in range between the central reference point and the auxiliary point.

2. The apparatus according to claim 1, wherein the third processing module is further configured to estimate the phase component of the auxiliary point by a second phase-compensation process.

3. The apparatus according to claim 1, wherein the third processing module is further configured to estimate a respective phase component of each auxiliary point by a second phase-compensation process.

4. The apparatus according to claim 3, wherein the third processing module is further configured to determine an average of the phase components estimated and normalized with respect to distances of the respective auxiliary points from the central reference point in Doppler-range coordinates and to apply the phase compensation as a function of the average of the estimated and normalized phase components.

5. The apparatus according to claim 2, wherein the first phase-compensation process and the second phase-compensation process comprise a Phase Gradient Autofocus process.

6. The apparatus according to claim 5, wherein the third processing module is configured to apply the phase compensation to the radar signal according to the relation $$s_C(rb, i) = s(rb, i) \cdot e^{-j \cdot \varphi_{CP}(i) \left[1 - \frac{(rb - rb_{CP})}{(rb_{CRP} - rb_{CP})}\right]}$$

where rb is a generic range coordinate, $rb_{CRP}$ and $rb_{CP}$ are range coordinates of the central reference point and of the auxiliary point, respectively, i is a generic slow-time coordinate, $s_C(rb,i)$ is the radar signal at coordinates rb, i after the compensation has been applied, s(rb,i) is the radar signal at coordinates rb, i before the compensation is applied, and $\varphi_{CP}(i)$ is the estimated phase component.

7. The apparatus according to claim 1, wherein the third processing module is further configured to select the auxiliary point as a function of contrast in the time domain.

8. The apparatus according to claim 1, wherein the third processing module is further configured to determine a start instant for production of SAR images from the radar signal on the basis of a Doppler coordinate of the auxiliary point and of a derivative of the Doppler coordinate of the auxiliary point.

9. A method for the production of synthetic-aperture-radar images comprising:
   emitting electromagnetic pulses towards a surveillance area;
   generating a radar signal in response to the reception of echoes of the electromagnetic pulses; and
   producing synthetic-aperture-radar images of moving objects present in the surveillance area from the radar signal, wherein producing synthetic-aperture-radar images comprises;
      applying a process of translational motion compensation to a central reference point of a moving object in a subaperture of the radar signal;
      executing a first phase-compensation process with the single central reference point as reference;
      estimating a phase component of at least one auxiliary point of the moving object, distinct from the central reference point; and
      applying phase compensation to the radar signal as a function of the phase component of the auxiliary point and of a normalization parameter to a distance in range between the central reference point and the auxiliary point.

10. The method according to claim 9, wherein estimating the phase component of the auxiliary point comprises executing a second phase-compensation process.

11. The method according to claim 9, wherein estimating the phase component of the auxiliary point comprises estimating a respective phase component of each auxiliary point by a second phase-compensation process.

12. The method according, to claim 10, wherein estimating the phase component of the auxiliary point comprises determining an average of the phase components estimated and normalized with respect to distances of the respective auxiliary points from the central reference point in Doppler-range coordinates and applying the phase compensation as a function of the average of the estimated and normalized phase components.

13. The method according, to claim 10, wherein the first phase-compensation process and the second phase-compensation process comprise a Phase Gradient Autofocus process.

14. The method according to claim 11, wherein applying the phase compensation to the radar signal comprises using the relation $$s_C(rb, i) = s(rb, i) \cdot e^{-j \cdot \varphi_{CP}(i) \left[1 - \frac{(rb - rb_{CP})}{(rb_{CRP} - rb_{CP})}\right]}$$

where rb is a generic, range coordinate, $rb_{CRP}$ and $rb_{CP}$ are range coordinates of the central reference point and of the auxiliary point, respectively, i is a generic, slow-time coordinate, $s_C(rb,i)$ is the radar signal at the coordinates rb, i after the compensation has been applied, s(rb,i) is the radar signal at the coordinates rb, i before the compensation is applied, and $\varphi_{CP}(i)$ is the estimated phase component.

15. The method according to claim 9, wherein the auxiliary point is selected as a function of contrast in the time domain.

16. The method according to claim 9, comprising determining a start instant for production of SAR images from the radar signal on the basis of a Doppler coordinate of the auxiliary point and of a derivative of the Doppler coordinate of the auxiliary.

* * * * *